United States Patent
Kobayashi et al.

(10) Patent No.: US 10,427,715 B2
(45) Date of Patent: Oct. 1, 2019

(54) DRIVING SUPPORT APPARATUS

(71) Applicant: MITSUBISHI JIDOSHA KOGYO KABUSHIKI KAISHA, Tokyo (JP)

(72) Inventors: Ayaka Kobayashi, Tokyo (JP); Kentaro Wakita, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 283 days.

(21) Appl. No.: 15/385,303

(22) Filed: Dec. 20, 2016

(65) Prior Publication Data

US 2017/0174262 A1 Jun. 22, 2017

(30) Foreign Application Priority Data

Dec. 21, 2015 (JP) .................. 2015-248542

(51) Int. Cl.
  *B62D 15/02* (2006.01)
  *B60Q 3/00* (2017.01)
  (Continued)

(52) U.S. Cl.
  CPC .......... *B62D 15/0265* (2013.01); *B60Q 3/00* (2013.01); *B60Q 5/006* (2013.01); *B60Q 9/008* (2013.01); *B60R 11/04* (2013.01); *B60W 30/12* (2013.01); *B60W 30/18163* (2013.01); *B60W 50/14* (2013.01); *G01S 19/14* (2013.01); *G08G 1/167* (2013.01); *B60W 2420/42* (2013.01); *B60W 2540/20* (2013.01); *B60W 2550/12* (2013.01); *B60W 2550/402* (2013.01); *B60W 2550/408* (2013.01); *B60W 2710/207* (2013.01)

(58) Field of Classification Search
  None
  See application file for complete search history.

(56) References Cited

U.S. PATENT DOCUMENTS 7,504,986 B2 * 3/2009 Brandt .................. G01S 13/931
  340/435
7,679,498 B2 * 3/2010 Pawlicki ............... B60W 30/18
  340/435

(Continued)

FOREIGN PATENT DOCUMENTS

| DE | 10 2005 013 669 A1 | 9/2006 |
| EP | 2 166 525 A1 | 3/2010 |
| JP | 2011-148479 A | 8/2011 |

*Primary Examiner* — Nicholas K Wiltey
(74) *Attorney, Agent, or Firm* — Birch, Stewart, Kolasch & Birch, LLP

(57) ABSTRACT

A driving support apparatus includes an other vehicle detector, an other vehicle information acquisition unit, a proximity detector, a proximity controller and a setting unit. The other vehicle detector detects an other vehicle travelling on the second lane. The other vehicle information acquisition unit acquires information containing the size of the other vehicle. The proximity detector outputs a proximity signal when it is detected that the other vehicle is located in the detection range of set on the second lane at a predetermined detection distance from the own vehicle. The proximity controller activates a proximity control unit when detecting that a turn signal lever is operated while the proximity signal is being output. The setting unit increases the detection distance according to the size of the other vehicle.

8 Claims, 7 Drawing Sheets

(51) Int. Cl.
*B60Q 5/00* (2006.01)
*B60Q 9/00* (2006.01)
*B60R 11/04* (2006.01)
*G01S 19/14* (2010.01)
*G08G 1/16* (2006.01)
*B60W 50/14* (2012.01)
*B60W 30/12* (2006.01)
*B60W 30/18* (2012.01)

(56) References Cited

U.S. PATENT DOCUMENTS

| | | | | |
|---|---|---|---|---|
| 8,589,014 | B2* | 11/2013 | Fairfield | G05D 1/024 701/28 |
| 8,874,267 | B1* | 10/2014 | Dolgov | G08G 1/16 700/255 |
| 9,041,806 | B2* | 5/2015 | Baur | B60R 1/00 348/148 |
| 9,523,984 | B1* | 12/2016 | Herbach | B62D 15/025 |
| 9,994,151 | B2* | 6/2018 | Lai | B60Q 9/008 |
| 10,032,369 | B2* | 7/2018 | Koravadi | G08G 1/0141 |
| 10,131,306 | B2* | 11/2018 | Takae | B60R 21/0134 |
| 2004/0016870 | A1* | 1/2004 | Pawlicki | B60W 30/18 250/208.1 |
| 2006/0184297 | A1* | 8/2006 | Higgins-Luthman | B60R 1/00 701/41 |
| 2006/0206243 | A1 | 9/2006 | Pawlicki et al. | |
| 2007/0018801 | A1* | 1/2007 | Novotny | B60Q 9/008 340/435 |
| 2008/0169938 | A1* | 7/2008 | Madau | B60R 1/00 340/901 |
| 2008/0252482 | A1* | 10/2008 | Stopczynski | G01S 13/87 340/903 |
| 2009/0079553 | A1* | 3/2009 | Yanagi | B60R 1/00 340/435 |
| 2009/0147083 | A1 | 6/2009 | Pawlicki et al. | |
| 2009/0243822 | A1* | 10/2009 | Hinninger | B60Q 9/008 340/435 |
| 2010/0002081 | A1 | 1/2010 | Pawlicki et al. | |
| 2010/0073152 | A1* | 3/2010 | Nagamine | B60W 50/08 340/425.5 |
| 2012/0166017 | A1 | 6/2012 | Kobayashi et al. | |
| 2012/0218124 | A1* | 8/2012 | Lee | B60W 30/143 340/904 |
| 2013/0063600 | A1 | 3/2013 | Pawlicki et al. | |
| 2013/0181860 | A1* | 7/2013 | Le | G06K 9/00791 382/103 |
| 2013/0226408 | A1* | 8/2013 | Fung | B60W 40/09 701/41 |
| 2014/0204212 | A1 | 7/2014 | Pawlicki et al. | |
| 2015/0063646 | A1* | 3/2015 | Wang | G06K 9/00812 382/104 |
| 2015/0302586 | A1* | 10/2015 | Fukata | G06K 9/00791 382/103 |
| 2016/0046288 | A1 | 2/2016 | Pawlicki et al. | |
| 2016/0090043 | A1* | 3/2016 | Kim | B60R 1/081 701/49 |
| 2016/0101730 | A1* | 4/2016 | Shehan | G01S 17/936 340/431 |
| 2016/0231746 | A1* | 8/2016 | Hazelton | G05D 1/0257 |
| 2016/0232790 | A1* | 8/2016 | Massey | B60W 30/08 |
| 2016/0252610 | A1* | 9/2016 | Smith | G01S 13/931 342/27 |
| 2016/0257308 | A1* | 9/2016 | Pawlicki | B60W 30/18 |
| 2017/0001639 | A1* | 1/2017 | Dempsey | B60W 30/146 |
| 2017/0132481 | A1* | 5/2017 | Sato | B60K 35/00 |
| 2017/0174262 | A1* | 6/2017 | Kobayashi | B60Q 3/00 |
| 2018/0004223 | A1* | 1/2018 | Baldwin | B60W 30/18154 |
| 2018/0077518 | A1* | 3/2018 | Nguyen | H04W 4/70 |
| 2018/0174458 | A1* | 6/2018 | Miller | G08G 1/163 |
| 2018/0190124 | A1* | 7/2018 | Kim | B60G 17/0162 |
| 2018/0215388 | A1* | 8/2018 | Takae | B60K 31/00 |
| 2018/0215389 | A1* | 8/2018 | Takae | B60R 21/00 |
| 2018/0222422 | A1* | 8/2018 | Takae | B60R 21/00 |
| 2018/0222423 | A1* | 8/2018 | Takae | G08G 1/167 |
| 2018/0316850 | A1* | 11/2018 | Friebe | H04N 5/23218 |

* cited by examiner

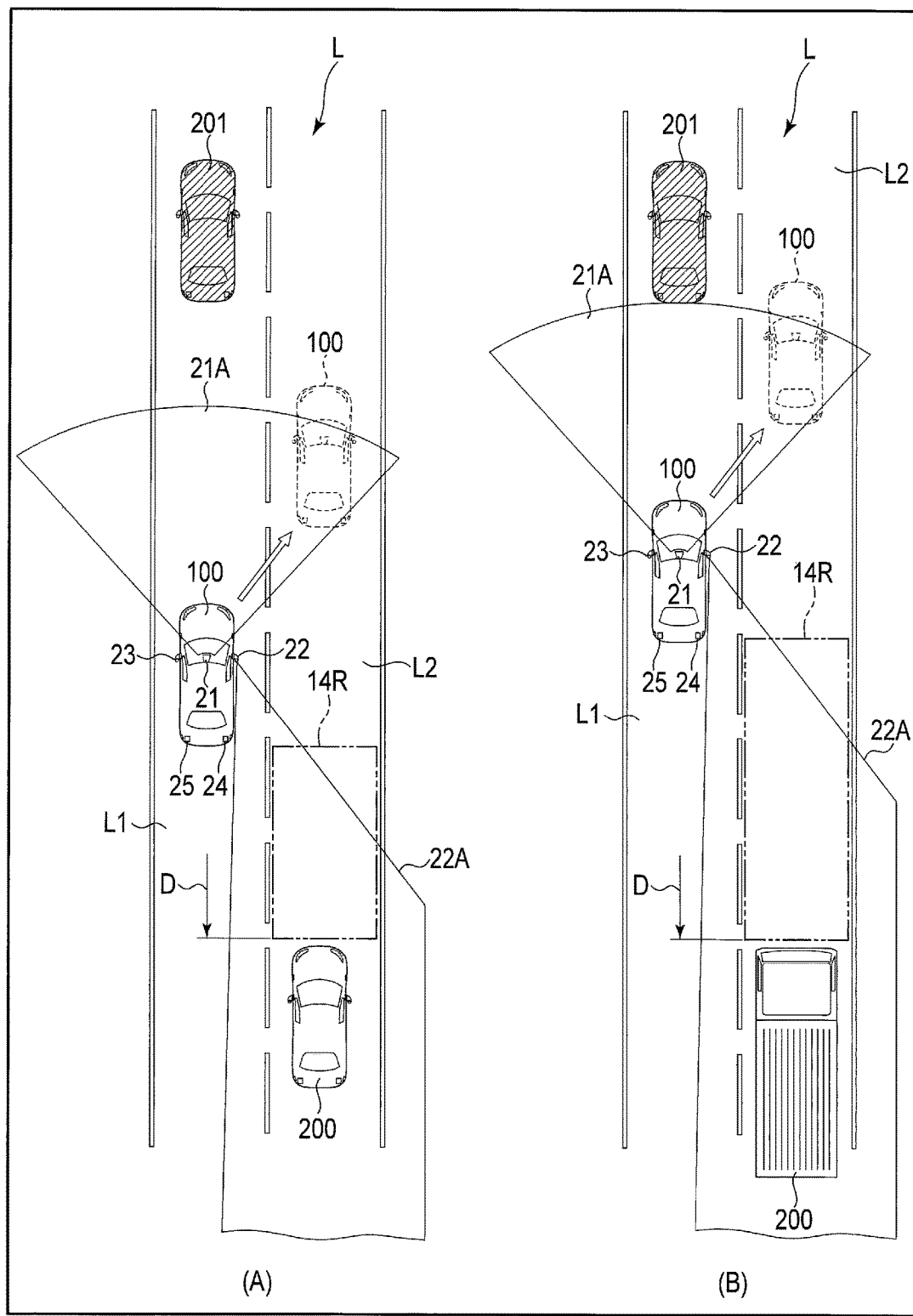
F I G. 4

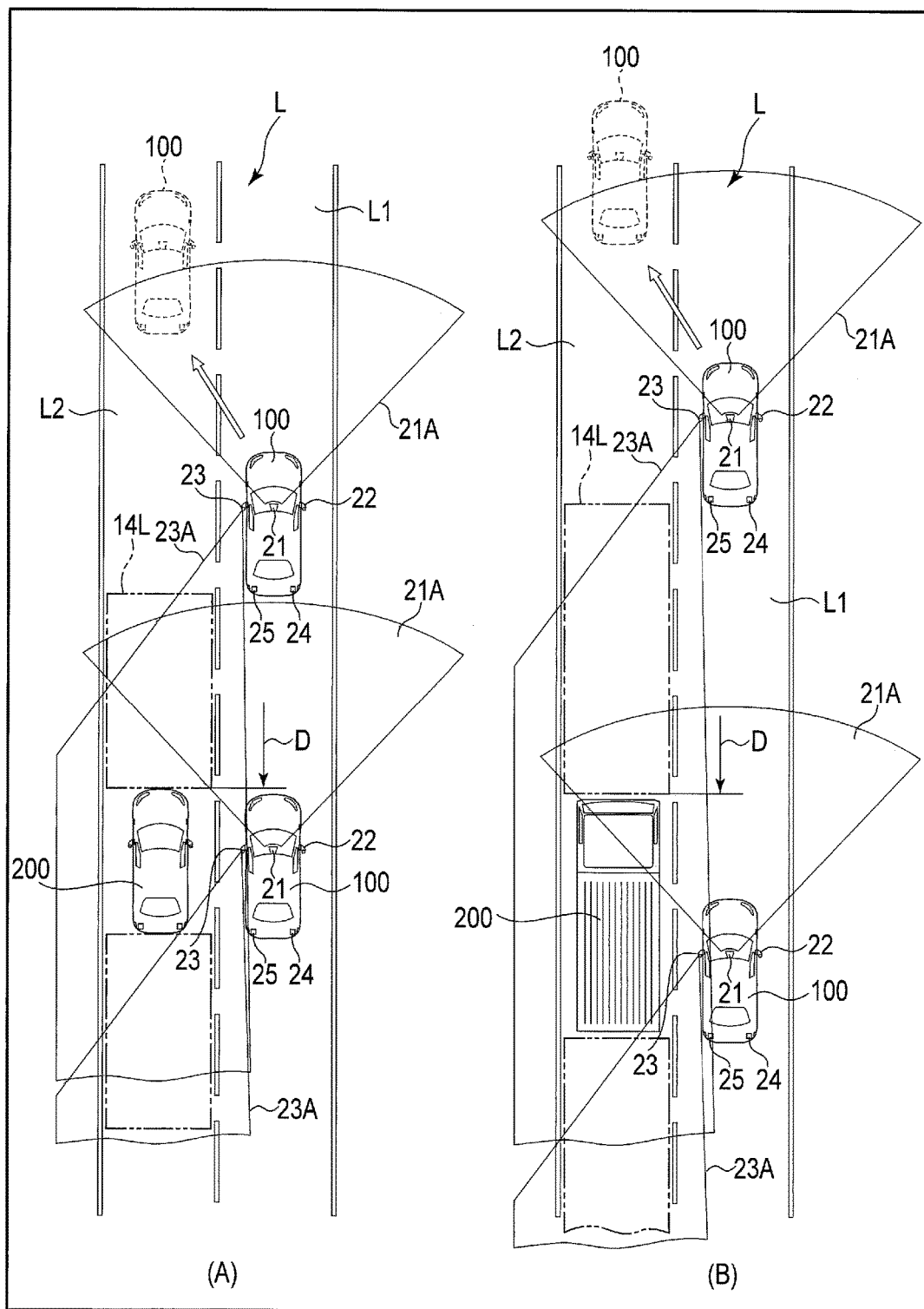
F I G. 5

DRIVING SUPPORT APPARATUS

CROSS-REFERENCE TO RELATED APPLICATIONS

This application is based upon and claims the benefit of priority from prior Japanese Patent Application No. 2015-248542, filed Dec. 21, 2015, the entire contents of which are incorporated herein by reference.

BACKGROUND OF THE INVENTION

1. Field of the Invention

The present invention relates to a driving support apparatus which alerts the driver by an alarm or the like when the driver is changing the lane to ahead of another vehicle traveling in a rear-side area of the own vehicle.

2. Description of the Related Art

There are conventional driving support apparatus which detect other vehicles and alert the driver by an alarm or the like in such a situation where the driver is driving a vehicle on the first lane of a two-lane section of a roadway, and the driver is changing the lane to another while other vehicles are traveling behind on the second lane. Blind Spot Warning (BSW), which detects a vehicle traveling in the blind spot of a rear-side area with respect to the own vehicle, and Lane Change Assist (LCA), which alerts the driver when a vehicle is approaching to pass the own vehicle, are well-known examples of the conventional devices.

BRIEF SUMMARY OF THE INVENTION

According to the present invention, there is provided a driving support apparatus which appropriately changes the zone of detection in a rear-side area of the own vehicle to detect other vehicles based on the size of these vehicles.

The driving support apparatus according to an embodiment of the present invention comprises an other vehicle detector, an other vehicle information acquisition unit, a proximity detector, a proximity controller and a setting unit. The other vehicle detector detects an other vehicle traveling on the second lane adjacent to the first lane on which the own vehicle is traveling. The other vehicle information acquisition unit acquires information containing at least the size of the other vehicle detected by the other vehicle detector. The proximity detector outputs an approaching signal while detecting another vehicle which exists in a zone of detection set on the second lane within a predetermined detection distance from the own vehicle. The proximity controller detects that a direction indicator is signaling to indicate the same direction to which the driver wishes to move the own vehicle as the same side where another vehicle is detected while the proximity signal is being output, and activates a proximity control unit. The setting unit compares the size of the own vehicle with that of the target vehicle and sets the detection distance to be larger when the size of the target vehicle is detected to be larger than the own vehicle.

According to the driving support apparatus according to one embodiment of the present invention, the detection distance of the detection range set on the second lane is determined according to the size of the other vehicle by the proximity detector. Therefore, when changing the lane to ahead of the other larger vehicle travelling behind on the second lane in order to pass another vehicle traveling ahead of the own vehicle, a sufficient distance with respect to the other vehicle can be secured. Further, even if the driver must slow down suddenly after changing the lane to ahead of the other vehicle, the braking distance with respect to the other vehicle can be fully secured because the detection distance has been set larger. For this reason, the driver may be able to drive in comfort without a nuisance which may be caused by other larger vehicles. Moreover, the driving support apparatus according to the invention resets the detection distance larger when the size of the other vehicles is larger than that of the own vehicle, which may be able to assist such a driver who feels uncomfortable when another larger vehicles approach the own vehicle.

BRIEF DESCRIPTION OF THE SEVERAL VIEWS OF THE DRAWING

FIG. 4 is a plan view of the own vehicle equipped with the driving support apparatus of FIG. 1 is making a lane change to ahead of another vehicle approaching from behind back: (A) showing the case where the size of the other vehicle is approximately the same as that of the own vehicle and (B) showing the case where the size of the other vehicle is larger than that of the own vehicle.

FIG. 5 is a plan view of the own vehicle equipped with the driving support apparatus of FIG. 1 is making a lane change to ahead of another vehicle which the driver has just passed: (A) showing the case where the size of the other vehicle is approximately the same as that of the own vehicle and (B) showing the case where the size of the other vehicle is larger than that of the own vehicle.

DETAILED DESCRIPTION OF THE INVENTION

Figure 1:
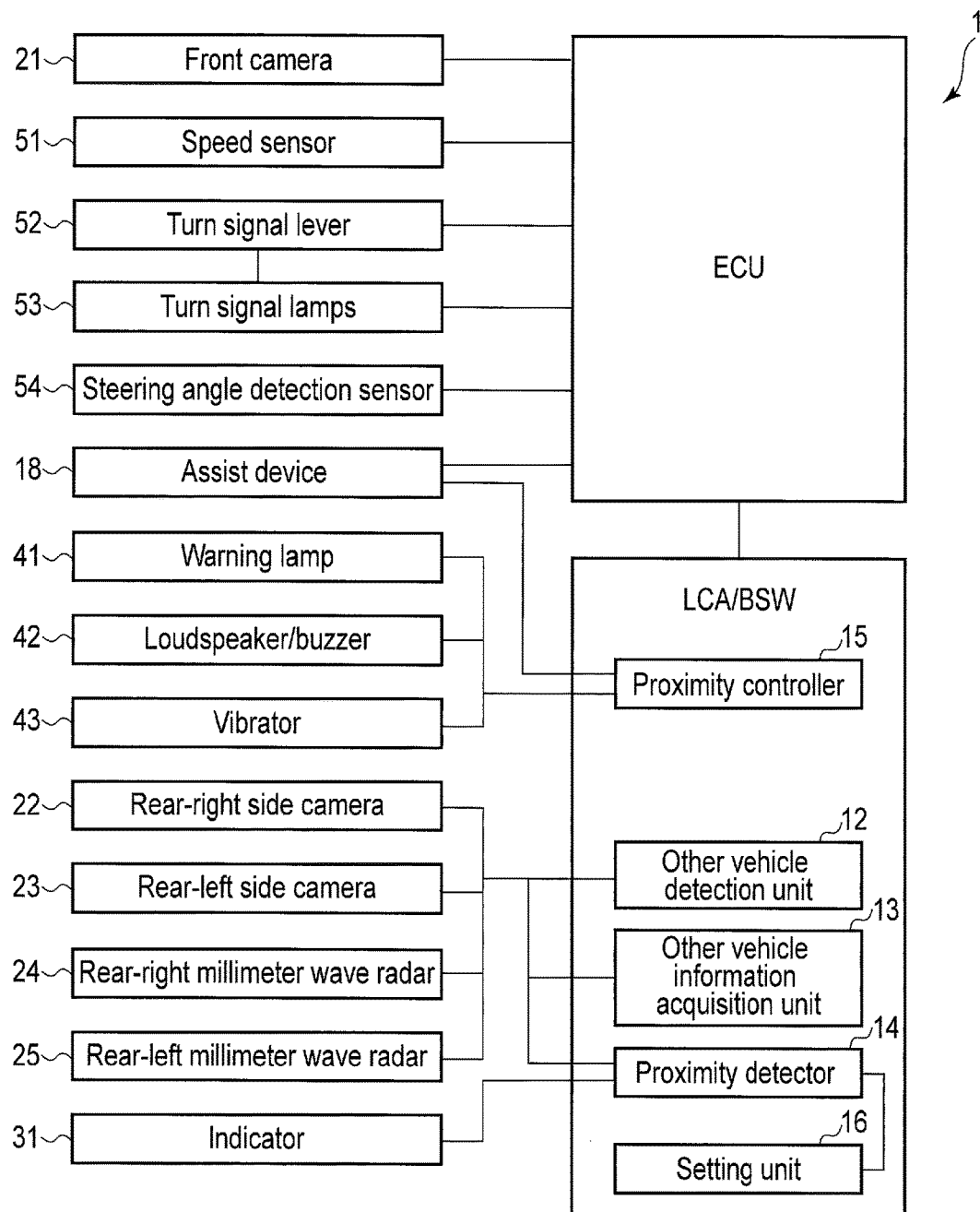
FIG. 1 is a block diagram of a driving support apparatus according to the first embodiment of the present invention.

A driving support apparatus 1 according to the first embodiment of the present invention will now be described with reference to FIGS. 1 to 4 by taking an example of a vehicle (a own vehicle 100) equipped with the system. In this specification, the directions "right" and "left" are defined as those viewed from the driver in terms of the traveling direction of the own vehicle 100. The description is based on the Road Traffic Law of Japan, in which a vehicular lane L is the left-hand lane traffic. Further, the description is based on the assumption that the vehicular lane L on one side has at least two lanes as shown in FIG. 3. Here, a lane on which the own vehicle 100 is travelling is defined as the first lane L1 and a lane along the first lane L1, on which another vehicle 200 is travelling in the same direction as that of the own vehicle 100 is defined as the second lane L2. As shown in FIG. 3 and FIG. 4 including parts (A) and (B), when the own vehicle 100 is travelling a left lane, the left lane is referred to as the first lane L1, whereas the right lane is referred to as the second lane L2. On the other hand, as shown in FIG. 5, parts (A) and (B), when the own vehicle 100 is travelling a right lane, the left lane is referred to as the second lane L2, whereas the right lane is referred to as the first lane L1.

When, despite that the driving support apparatus 1 detects another vehicle 200 travelling on the second lane L2 of a rear side area, which is a blind spot of the driver of the own vehicle 100, and the driver tries to change the lane without recognizing the presence of the vehicle 200, the proximity control unit is activated, for example, to alert the driver, for example, by an vehicle-approach alarm, thereby preventing the own vehicle 100 from colliding with the vehicles 200. In this embodiment, when the driver of the vehicle 100 tries to change the lane to ahead of the other vehicles 200, the detection distance D of the detection ranges 14R and 14L set in the rear-side areas of the own vehicle 100 to detect another vehicle 200 travelling behind is elongated backwards according to the size of the other vehicle 200. Thus, a sufficient distance can be maintained behind the own vehicle 100 when changing the lane to ahead of the other vehicle 200 if it is large-sized, and therefore it is possible to appropriately adjust the timing to change the lanes without having to feel a nuisance which may be caused by the large-sized other vehicle 200.

The driving support apparatus 1 of the first embodiment comprises an other vehicle detector 12, an other vehicle information acquisition unit 13, a proximity detector 14, a proximity controller 15 and a setting unit 16 as shown in the block diagram of FIG. 1. The driving support apparatus 1 partly uses the information acquired from a portion including the conventional passing vehicle approach alarm (Lane Change Assist [LCA]) or a rear-side blind sport alarm (Blind Spot Warning [BSW]). The passing vehicle approach alarm (LCA) or the rear-side blind sport alarm (BSW) are connected to an electronic control unit ECU of the own vehicle 100 as a part of the driving support apparatus 1 and they are integrally controlled.

The block diagram of FIG. 1 shows, together with the driving support apparatus 1 of first embodiment, other structures installed in the own vehicle 100 to cooperate with the driving support apparatus 1. As shown in FIG. 1, the own vehicle 100 comprises, at least, a first camera (front camera) 21, second cameras (a rear-right side camera and a rear-left side camera) 22 and 23, radars (a rear-right side millimeter wave radar and a rear-left side millimeter wave radar) 24 and 25, an LCA indicator 31, which is an indicator lamp to be turned on based on a proximity signal, a warning lamp 41 which visually outputs a proximity alarm as a proximity control unit, a loudspeaker (buzzer) 42 which auditorily outputs a proximity alarm as a proximity control unit, a vibrator 43 which outputs a proximity alarm by way of tactile vibration as a proximity control unit, a speed sensor 51 which detects the speed of the own vehicle 100, a turn signal lever 52 which operates the blinkers, turn signal lamps 53 which indicate a moving direction of the own vehicle 100 to the surrounding of the vehicle, a steering angle detection sensor 54 which detects the rotation angle of the steering. FIG. 3 is a plan view schematically showing a state where the own vehicle 100 is travelling on a left lane of the vehicular lane L of a two-lane section of a roadway, with illustrations of a shooting range 21A of the first camera 21, respective shooting ranges 22A and 23A of the second cameras 22 and 23, respective observation ranges 24A and 25A of the radars 24 and 25, detection ranges of 14R and 14L set by the proximity detector 14 and a detection distance D, which is the tail end of the detection ranges 14R and 14L and set by the setting unit 16.

The other vehicle detector 12 detects the other vehicle 200 travelling on the second lane L2 adjacent to the first lane L1. In this embodiment, the own vehicle 100 comprises the first camera (front camera) 21 as a means to detect the other vehicle 200 travelling ahead of the own vehicle 100 and the second cameras (rear-right side and rear-left side cameras) 22 and 23 as means to detect the other vehicle 200 locating from the side to rear areas (rear-side areas) of the own vehicle 100, as shown in FIGS. 1 and 3.

The first camera 21 is installed in the body of the own vehicle 100 towards the front side of the vehicle, with a setting of the shooting range 21A which contains at least the second lane L2 in its angle of view. In FIG. 3, the shooting range 21A is illustrated to have a fan shape ahead of the own vehicle 100, but the actual shooting range 21A covers the entire range which can be shot with the first camera 21. In this embodiment, the first camera 21 is placed between the rearview mirror and the windshield, and shoots laterally uniformly because the own vehicle 100 may travel on either a right lane or a left lane.

The second cameras 22 and 23 are installed in the body such as to face the rear sides of the own vehicle 100. In this embodiment, they are built in right and left door mirrors 101 and 102, respectively, as shown in FIG. 3. The shooting ranges 22A and 23A of the second cameras 22 and 23 are set so as to include the second lane L2 in the angle of view from the ranges of the blind spots of the rear-right and rear-left sides as shown in FIG. 3.

When shooting conditions are good, the first camera 21 and the second cameras 22 and 23 can cover the range to hundreds of meters beyond. The other vehicle detector 12 detects other vehicles 200 traveling on the second lane L2 based on the images acquired with the first camera 21 and the second cameras 22 and 23 by image analysis.

Further, in this embodiment, the own vehicle 100 comprises the radars 24 and 25 as means to detect the other vehicle 200 as shown in FIGS. 1 and 3. Here, the radars 24 and 25 are of a millimeter wave type, and the rear-right millimeter wave radar (24) is built in the right end portion of a rear bumper 103 of the vehicle body and the rear-left millimeter wave radar (25) is built in the left end portion of the rear bumper 103 of the vehicle body. The radars 24 and 25 are set to cover the areas of the second lane L2 behind the sides of the own vehicle 100 as the observation ranges of 24A and 25A. With the radars 24 and 25, the relative velocity and distance between the own vehicle 100 and the other vehicle 200, and the range of the location the other vehicle 200 with respect to the own vehicle 100 can be precisely detected. In place of the millimeter wave radars, infrared radars, ultrasonic radars or laser radars may be adopted. But with millimeter wave radars, it is possible to detect the other vehicle 200 without being greatly affected by the climate conditions such as rain and fog or sunshine conditions.

The other vehicle information acquisition unit 13 acquires information on the other vehicle 200, which contains at least the size thereof when the other vehicle detector 12 detects the other vehicle 200. In this embodiment, the size of the own vehicle 100 can be obtained from the information pre-registered in the storage portion or the like, connected to the ECU. The size of the other vehicle 200 is determined by image analysis based on the images acquired with the first camera (front camera) 21 if the other vehicle 200 is located ahead of the own vehicle 100, or the images acquired with the second camera (rear-right or rear-left side cameras) 22 or 23 if the other vehicle 200 is located behind the own vehicle 100. Or the relative difference in size between the own vehicle 100 and the other vehicle 200 can be calculated by comparing with the background or some other vehicle 200 located in its surrounding. Furthermore, it is also possible to estimate the weight of the other vehicle 200 by computing the occupancy volume of the other vehicle 200 by image analysis based on the images acquired to figure out the size of the other vehicle 200. The weight information of the other vehicle 200 is effective to estimate the braking distance of the other vehicle 200.

Besides the size, the information may include the speed of the other vehicle 200. The speed of the own vehicle 100 is acquired with a speed sensor 51, whereas the speed of the other vehicle 200 can be computed based on the images acquired with the first camera 21 and the second cameras 22 and 23. Since this embodiment includes the radars (rear-right millimeter wave radar and rear-left millimeter radar) 24 and 25, an even more accurate speed of the other vehicle 200 can be obtained if the other vehicle 200 comes into the observation ranges 24A and 25A of the radars 24 and 25, together with its accurate position based on the measurement data of these radars.

The proximity detector 14 outputs an proximity signal if detecting the other vehicle 200 in the detection ranges 14R and 14L shown in FIG. 3, set as areas behind the own vehicle 100 by the detection distance D. In this embodiment, the proximity detector 14 includes an indicator which notifies the proximity signal to the driver of the own vehicle 100. The indicator is illustrated as an LCA indicator 31 provided in each of right and left sideview mirrors 101 and 102. When the other vehicle 200 are detected by the rear-right side camera 22 and the rear-right side millimeter wave radar (24), the LCA indicator 31 of the right sideview mirror 101 is lit, whereas when the other vehicle 200 are detected by the rear-left side camera (23) and the rear-left millimeter wave radar (25), the LCA indicator 31 of the left sideview mirror 102 is lit.

Further, if the proximity controller 15 detects that the blinker is operated for the direction to move the own vehicle 100 to the same side as that where the other vehicle 200 is detected while the proximity signal is being outputted from the proximity detector 14, the proximity controller 15 operates the proximity controller unit. In this embodiment, the blinkers include the turn signal lever 52 and the turn signal lamps 53. When the turn signal lever 52 is operated to light the turn signal lamp 53, that is, when the blinkers are operated, an operation signal is output. Thus, the proximity controller 15 activates the proximity controller unit if the proximity signal output from the proximity detector 14 and the operation signal output from the blinkers are detected.

The proximity controller 15 includes the warning lamp 41 to be lit in sight of the driver of the own vehicle 100, the loudspeaker (buzzer) 42 installed in the interior of the own vehicle 100 and the vibrator 43 which generate vibration transmitted to the steering, as proximity controller units. The activation of the proximity controller units means to notify the driver of the own vehicle 100 that the other vehicle 200 is located in the detection range 14R or 14L when the driver of the own vehicle 100 is changing the lane from the first lane L1 to the second lane L2 by lighting the warning lamp 41 turn, generating a beep sound by the loudspeaker (buzzer) 42, and generating vibration to the steering with the vibrator 43. Note that instead of beep sound, the loudspeaker 42 may output a voice announcing to the driver that the other vehicle 200 is in the detection range 14R or 14L of the second lane L2 or that it is dangerous to change the lane as it is.

The setting unit 16 determines the size of the other vehicle 200 from the images shot with the first camera 21 or the second cameras 22 and 23. If the size is determined to be larger than that of the ordinary motor vehicles, or the own vehicle 100, or a predetermined size, the detection distance of the detection ranges 14R and 14L set in the area on the second lane L2 behind the own vehicle 100 is elongated. In short, the detection ranges 14R and 14L are expanded (extended) backwards with respect to the own vehicle 100. Here, the setting unit 16 increases the detection distance D of the detection ranges 14R and 14L more as the difference in size between the own vehicle 100 and the other vehicle 200 is larger. If the other vehicle 200 traveling the second lane L2 behind the own vehicle 100 is of a large size such as a heavy-duty truck or a trailer, it can be detected earlier than usual by increasing the detection distance D, thereby allowing sufficient time to notify the driver. Further, by checking with the LCA indicators 31 that there is no other vehicle (200) of a large size within the detection distance D, the driver can make sure that a sufficient distance is maintained with respect to the other vehicle 200 and therefore he/she can change the lane comfortably.

Further, in this embodiment, when the vehicle 100 comprises an assist device 18 which changes the steering angle of the steering as shown in FIG. 1, the steering reaction force generated with the assistant device 18 may also function as a proximity controller unit. The steering reaction force acts in the direction which inhibits the own vehicle from approaching the second lane L2. The angle of rotation operated on the steering with the assistant device 18 is controlled by the steering angle detection sensor 54 by the feedback manner.

Figure 2:
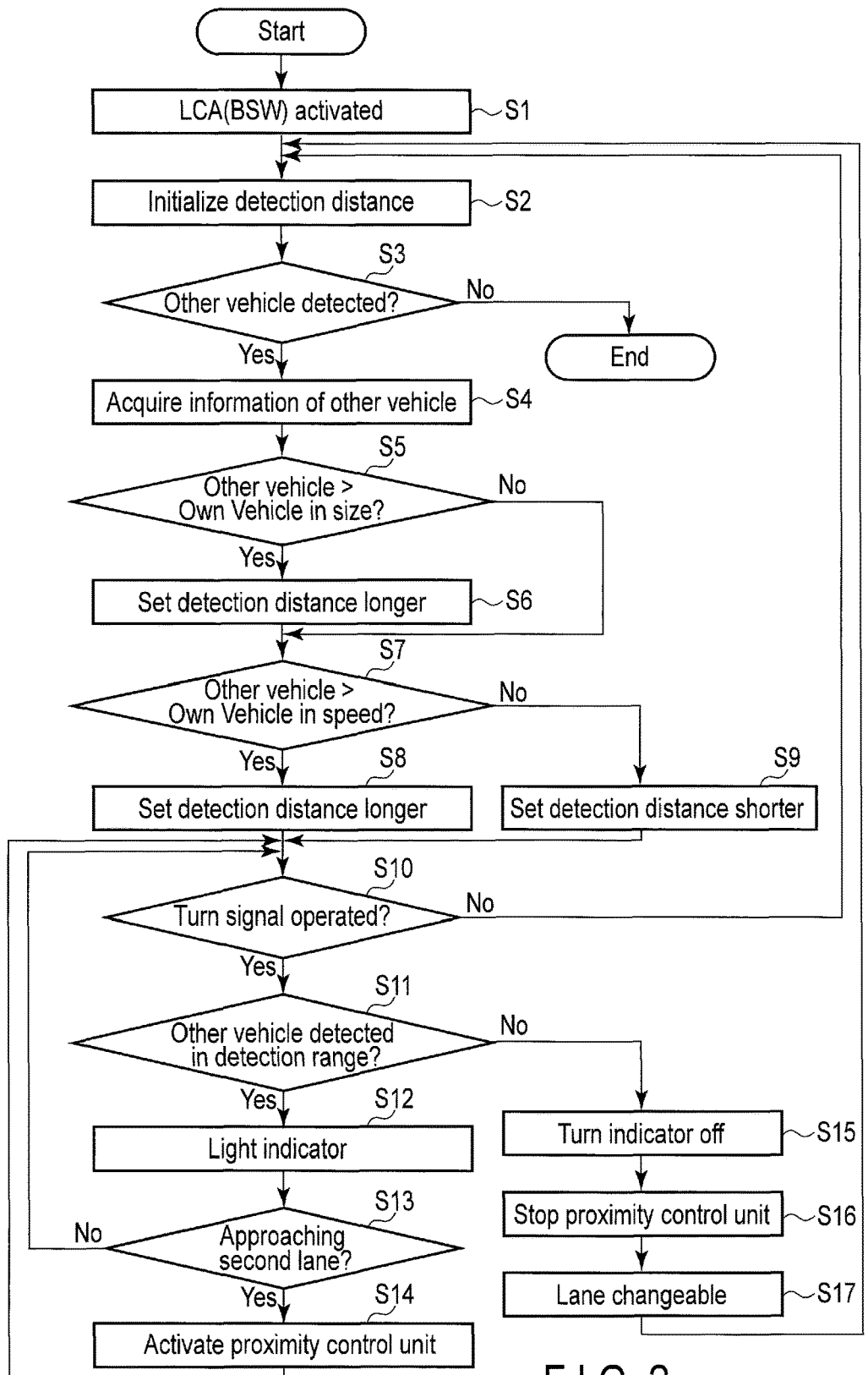
FIG. 2 is a flow chart of a control process performed with the driving support apparatus of FIG. 1 when the speed of the own vehicle is higher than that of other vehicles.
Figure 3:
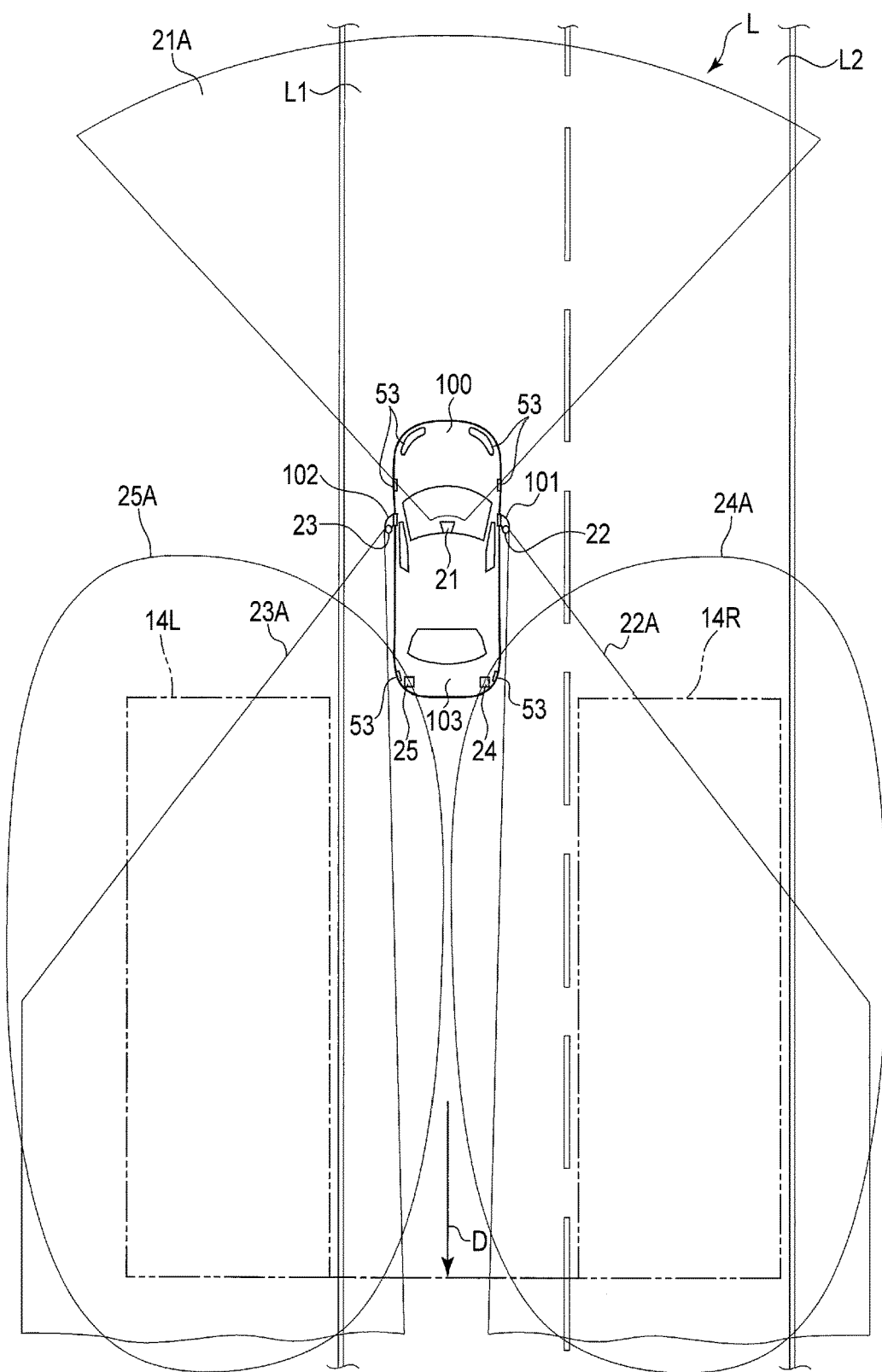
FIG. 3 is a plan view schematically showing a state where the own vehicle equipped with the driving support apparatus of FIG. 1 is travelling on a vehicular lane.

The driving support apparatus 1 having the above-described structure is controlled in the processing steps indicated by the flow chart of FIG. 2. The operation of the driving support apparatus 1 of the case where the own vehicle 100 and the other vehicles 200 are travelling on the vehicular lane L of a two-lane section of a roadway will be described in the following two situations: when the own vehicle 100 changes the lane to ahead of the other vehicle 200 approaching from behind (FIGS. 2 and 4) and when the own vehicle 100 changes the lane to ahead of the other vehicle 200 after overtaking the other vehicle 200. In both situations, the own vehicle 100 changes the lane to ahead of the other vehicle 200. More specifically, FIG. 4 shows the case where the speed of the own vehicle is slower than that of the other vehicle 200, whereas FIG. 5 shows the case where the speed of the own vehicle 100 is faster than that of the other vehicle 200.

(When Changing the Lane to Ahead of the Other Vehicle Approaching from Behind)

First, the situation where the other vehicle 200 is approaching from behind when the own vehicle 100 changes the lane to the second lane L2 in order to overtake the vehicle (other vehicle 201) travelling ahead of the vehicle 100 will be described. In FIG. 4, the left lane on which the own vehicle 100 is travelling is the first lane L1, and the right lane on which the other vehicle 200 is travelling in the same direction as that of the vehicle 100 is the second lane L2. Furthermore, FIG. 4 shows the situation where the other vehicle 201 slower than the own vehicle 100 is travelling ahead of the vehicle 100 on the first lane, and the own vehicle 100 is overtaking the vehicle 201.

FIG. 4 (A) shows the case where the other vehicles 200 has approximately the same vehicle body size as that of the own vehicle 100, whereas FIG. 4 (B) shows the case where the vehicle body size of the other vehicle 200 is larger than that of the own vehicle 100 and therefore the detection distance D of the detection ranges 14R and 14L is set larger towards the rear side than the case (A). In both cases (A) and (B) of FIG. 4, the other vehicle 200 illustrated in the lower section of the figure is located out of the detection distance D of the detection range 14R of the own vehicle 100 and the own vehicle 100 is in the state where it can change the lane to the position illustrated by the broken line on the second lane L2.

The control flow of the driving support apparatus 1 in the case where the driver changes the lane to ahead of the other vehicle 200 approaching from behind will be described with reference to FIG. 2. In the driving support apparatus 1 of the own vehicle 100, if the ECU detects that the own vehicle 100 is stably travelling at a predetermined speed or faster with the speed sensor 51, the LCA (BSW) is activated by the ECU (S1) and thus the driving support apparatus 1 of the own vehicle 100 starts function as indicated in the flow chart of FIG. 2. When the driving support apparatus 1 is started, the detection distance D of the detection ranges 14R and 14L is initialized (S2) as indicated in FIG. 2. Next, other vehicle 200 which is travelling ahead or behind the own vehicle 100 is detected by the other vehicle detector 12 based on the images acquired with the first camera 21 and the second cameras 22 and 23 (S3). When other vehicle is detected, the information containing at least the size of the other vehicle 200 is acquired by the other vehicle information acquisition unit 13 (S4). In this embodiment, the information which also contains the speed in addition to the size is acquired.

The setting unit 16 compares the size of the own vehicle 100 (or standard-sized vehicle), which is preset and that of the other vehicle 200 (S5). Here, if the other vehicle 200 is larger, that is, in the case (B) of FIG. 4, the detection distance D of the detection ranges 14R and 14L is set greatly longer in the rear direction (S6). If the size of the other vehicles 200 and that of the own vehicle 100 do not differ greatly, that is, in the case (A) of FIG. 4), S6 is skipped and the process proceeds to the following step. Next, the setting unit 16 compares the speed of the other vehicle 200, acquired with the other vehicle information acquisition unit 13 and the speed of the own vehicle 100 obtained with the speed sensor 51 to each other (S7). If the speed of the other vehicles 200 is faster, the detection distance D is further increased in the rear direction (S8). If the speed of the own vehicle 100 is higher, the detection distance D is decreased (S9).

In FIG. 4, the own vehicle 100 changes the lane to the second lane L2 in order to overtake the another vehicle 201 travelling ahead of the vehicle 100, it is checked here whether the blinkers are operating (S10). When the blinkers are operating, it is checked by the proximity detector 14 whether the other vehicle 200 is located in the detection range 14R or 14L (S11). When the blinkers are not being operated, which means that the driver is not changing the lane to ahead of the other vehicle 200 which has been detected in this stage, the process returns to a step before S2.

When the other vehicle 200 is detected in the detection range 14R or 14L in S11, the LCA indicator 31 on the side where the other vehicle 200 is detected is lit (S12). In FIG. 4, since the own vehicle 100 is travelling on the left lane, the other vehicles 200 traveling on the right lane is detected and the right LCA indicator 31 is lit. The LCA indicator 31 being lit means that the other vehicle 200 is in the detection range 14R, it is checked here whether the own vehicle 100 is approaching the second lane L2 on the right side based on the detection signal of the steering angle detection sensor 54 (S13). If not approaching, which means that the driver has noticed the LCA indicator 31 and is observing the behavior of the other vehicles 200 on the second lane L2, then the process returns to a step before S10 and it is checked whether the blinkers are operating continuously (S10). While waiting for the other vehicle 200 approaching from behind to pass the side of the own vehicle 100 with the blinkers being operated, the control flow from S10 to S13 is repeated. If the driver gives up the lane change and stops the blinkers, the control flow returns to S2 from S10.

If the driver is approaching the second lane L2 without noticing the LCA indicator 31 in S13, a detection signal is output from the steering angle detection sensor 54, and the proximity controller 15 activates a proximity control unit based on this signal (S14). The driving support apparatus 1 turns on the warning lamp 41 as a proximity control unit and also outputs a beep sound by the loudspeaker (buzzer) 42 as another proximity control unit. Further, vibration may be generated in steering by the vibration generator 43 as a proximity control unit. In this embodiment, the vehicle is further equipped with the assist device 18, a steering reaction force may be generated so as to guide the own vehicle 100 in a direction away from the second lane L2 (a direction towards the center of the first lane L1) by the assist device 18 as a proximity control unit. As the proximity control unit is activated, the vehicle 100 is guided to stay on the first lane L1, and thus the collision with the other vehicle 200 approaching from behind on the second lane L2 can be avoided.

After the proximity control unit is activated (S14), the control flow returns to a step before S10. When the driver of the own vehicle 100 waits for the other vehicle 200 to past while the blinkers being on, the control flow from S10 to S13 is repeated. Note that if it is confirmed that the blinkers are stopped in S10 or that the vehicle is not approaching the second lane L2 by the steering angle detection sensor 54 in S13 while repeating the control flow from S10 to S13, the proximity control units are canceled.

The situations in which it is confirmed that the blinkers are being operated in S10 and the other vehicle 200 is not detected in the detection range 14R in S11 mean that the other vehicle 200 is out of the detection range 14R as shown in FIGS. 4 (A) and (B). Since the other vehicle 200 is not in the detection range 14R, the light of the LCA indicator 31 is turned off (S15). Further, the proximity control units are stopped here even if they are being operated (S16) to become a lane changeable state (S17). If the own vehicle 100 changes the lane to the second lane L2 in this manner, the control flow returns to S2 to initialize the detection distance D.

As described above, when changing the lane to ahead of the other vehicle 200 approaching from behind, the driving support apparatus 1 sets the detection distance D of the detection ranges 14R and 14L of the proximity detector 14 based on the size of the approaching vehicle 200, that is, the detection distance D is set greater if the other vehicle 200 is larger than the own vehicle 100. Thus, the driver checks whether the LCA indicator 31 is turned on or off when operating the blinkers, to be able to judge easily whether he or she can safely change the lane to ahead of the other vehicle 200 approaching from behind.

(When Changing the Lane to Ahead of the Other Vehicle which Just Overtaken)

Next, the situation where the driver has already changed the lane to the right lane to pass the other vehicle 200 travelling ahead of the own vehicle 100, and is changing the lane to ahead of the other vehicle 200 after overtaking the other vehicle 200 will be described. In other words, the situation is that the driver changes the lane from the left lane to the right lane, and then is changing the lane back to the left lane. In FIG. 5, the right lane on which the own vehicle 100 is travelling is the first lane L1, and the left lane on which the other vehicle 200 is travelling in the same direction as that of the own vehicle 100 is the second lane L2.

FIG. 5 (A) shows the case where the size of the body of the other vehicle 200 is approximately the same as that of the own vehicle 100, whereas FIG. 5 (B) shows the case where the size of the body of the other vehicle 200 is larger than that of the own vehicle 100. The detection distance D of the detection ranges 14R and 14L is set more greatly in the case (B) than in the case (A). Further, since the speed of the own vehicle 100 is faster than that of the other vehicle 200 in the case of FIG. 5 compared with that of FIG. 4, the detection distance D of the detection ranges 14R and 14L is set smaller in FIG. 5 than in FIG. 4.

The cases (A) and (B) of FIG. 5 show the situation where the own vehicle 100 illustrated in the lower section is traveling alongside the other vehicle 200 in order to overtake the other vehicle 200, and just before the other vehicle 200 enters the detection range 14L, the own vehicle 100 illustrated in the upper section has overtaken the other vehicle 200 and therefore the other vehicle 200 is located out of the detection range 14L, so that the driver can change the lane to the position indicated by the broken line in the upper section of the second lane L2.

The situation where the driver is changing the lane to ahead of the other vehicle 200 which the own vehicle 100 overtook will be described by way of the control flow with reference to the flow chart of FIG. 2. The other vehicle 200, which is an object to overtake is already detected in S3 based on the images acquired with the first camera 21, and the information containing the size and speed of the other vehicle 200 is also acquired by the other vehicle information acquisition unit 13 (S4). Then, the size of the own vehicle 100 is compared with that of the other vehicle 200 (S5). Here, when the other vehicle 200 is larger, that is, in the case (B) of FIG. 5, the detection distance D of the detection range 14L is increased in the rear direction (S6). When the size of the other vehicle 200 does not greatly differ from that of the own vehicle 100, that is, in the case (A) of FIG. 5, the step of S6 is skipped and the process proceeds to the next.

Subsequently, the speed of the other vehicle 200 is compared with that of the own vehicle 100 (S7). In FIG. 5, the driver changes the lane to ahead of the other vehicle 200 which the driver just overtook. Here, the speed of the own vehicle 100 is faster than that of the other vehicle 200, the detection distance D set may be decreased (S9). But it is preferable that the detection range having been set larger for the case where the size of the other vehicle 200 was larger than that of the own vehicle 100 should be maintained as it is. Thus, when the other vehicle 200 is judged to be larger than the own vehicle 100 in S5, the process may proceed to S10 after increasing the detection distance D (S6). That is, only when the size of the own vehicle 100 is approximately the same as that of the other vehicle 200, the speed of the own vehicle 100 is compared with that of the other vehicle 200 (S7). Then, when the other vehicle 200 is faster, the detection distance D is increased (S8), whereas the other vehicle 200 is slower, the detection distance D is decreased (S9).

When the detection distance D of the detection range 14L is set based on the information of the other vehicle 200 detected, it is then checked whether the blinkers are being operated, that is, if the driver intend to change the lane (S10). When the blinkers are being operated, it is checked whether the other vehicle 200 is detected in the detection range 14L (S11). If the other vehicle 200 is in the detection range 14L, the LCA indicator 31 is lit to notify the driver that a sufficient distance with respect to the other vehicle 200 has not been secured. Then, it is checked whether the own vehicle 100 is approaching the left lane as the second lane L2 (S12). If approaching the second lane L2 is detected by the steering angle detection sensor 54, the proximity control units are activated (S14). As to the proximity control units, the above-provided description for changing the lane to ahead of the other vehicle 200 approaching should be referred to. Further, for the case where the driver waits while the turn signal lever is operated until a safe distance is secured with respect to the other vehicle 200, a similar process is carried out and the control flow from S10 to S13 is repeated.

When a sufficient distance with respect to the other vehicle 200 which the driver just overtook is secured, the other vehicle 200 is no longer detected in the detection range 14L in S11. Thus, the LCA indicator 31 is turned off (S15) and the proximity control units are stopped (S16) if they are being operated, to restore a lane changeable state (S17). That is, the driver can change the lane to the position of the own vehicle 100 illustrated by the broken line in FIGS. 5 (A) and (B).

As can be seen in FIGS. 5 (A) and (B), if the other vehicle 200 is larger than the own vehicle 100, the driving support apparatus 1 increases the detection distance D in the rear direction to expand (extend) the detection range 14L (14R). In this manner, when the own vehicle 100 changes the lane to ahead of the other vehicle 200, which is larger than the own vehicle 100 (for example, a large-size vehicle such as a truck or a bus), a sufficient distance set in consideration of the braking distance of the large vehicle 200 is secured, and therefore the driver can change the lane without an intimidation.

A driving support apparatus 1 according to the second embodiment will be described with reference to FIGS. 6 and 7. In the driving support apparatus 1 of the second embodiment, the structural members having the same function as those of the driving support apparatus 1 of the first embodiment will be designated by the same reference symbols and for the detailed explanation therefore, the descriptions provided in the first embodiment should be referred to. The second embodiment is based on the presumption that the other vehicle 200 has the same functions as those of an own vehicle 100.

Figure 6:
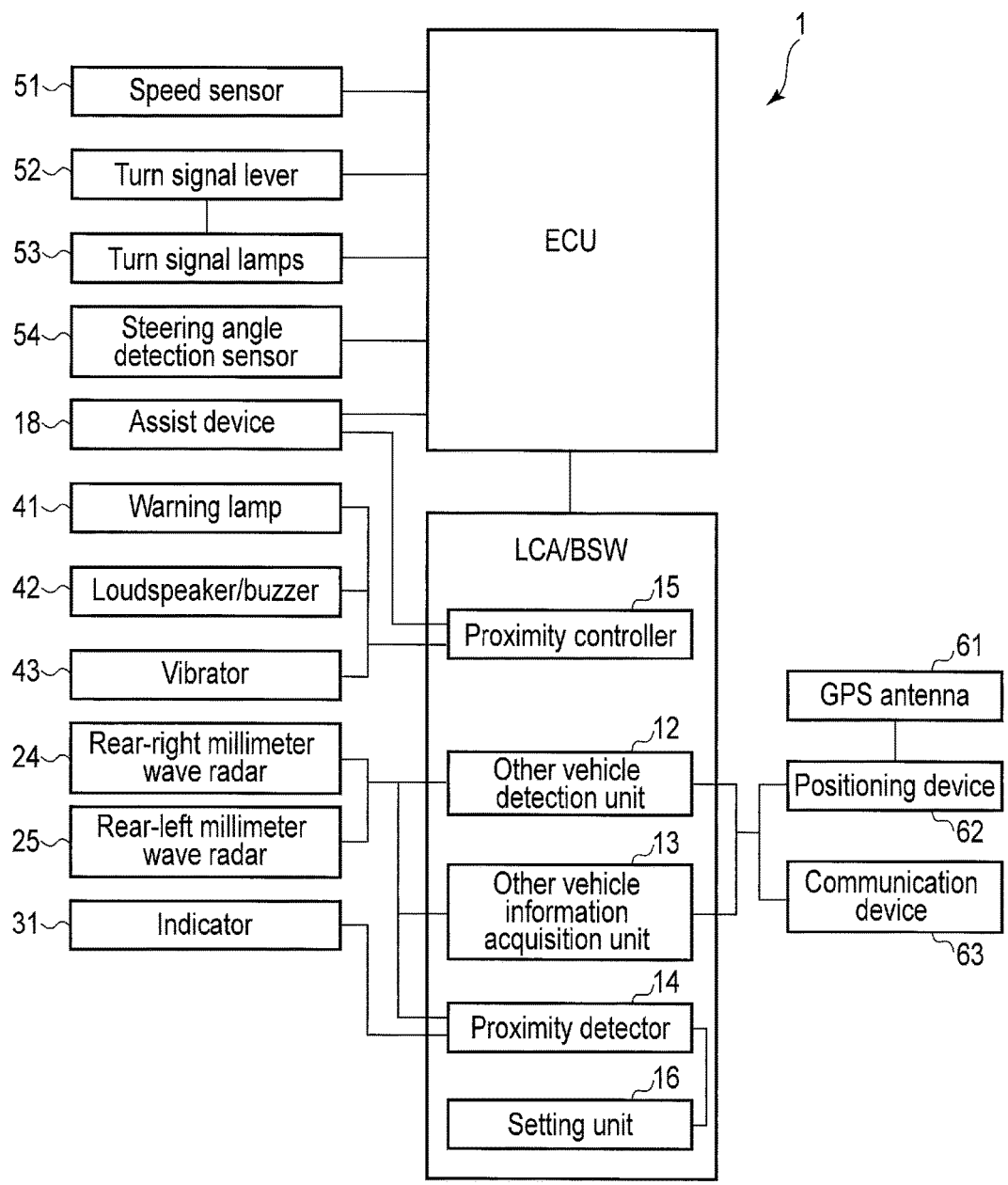
FIG. 6 is a block diagram of a driving support apparatus according to the second embodiment of the present invention.
Figure 7:
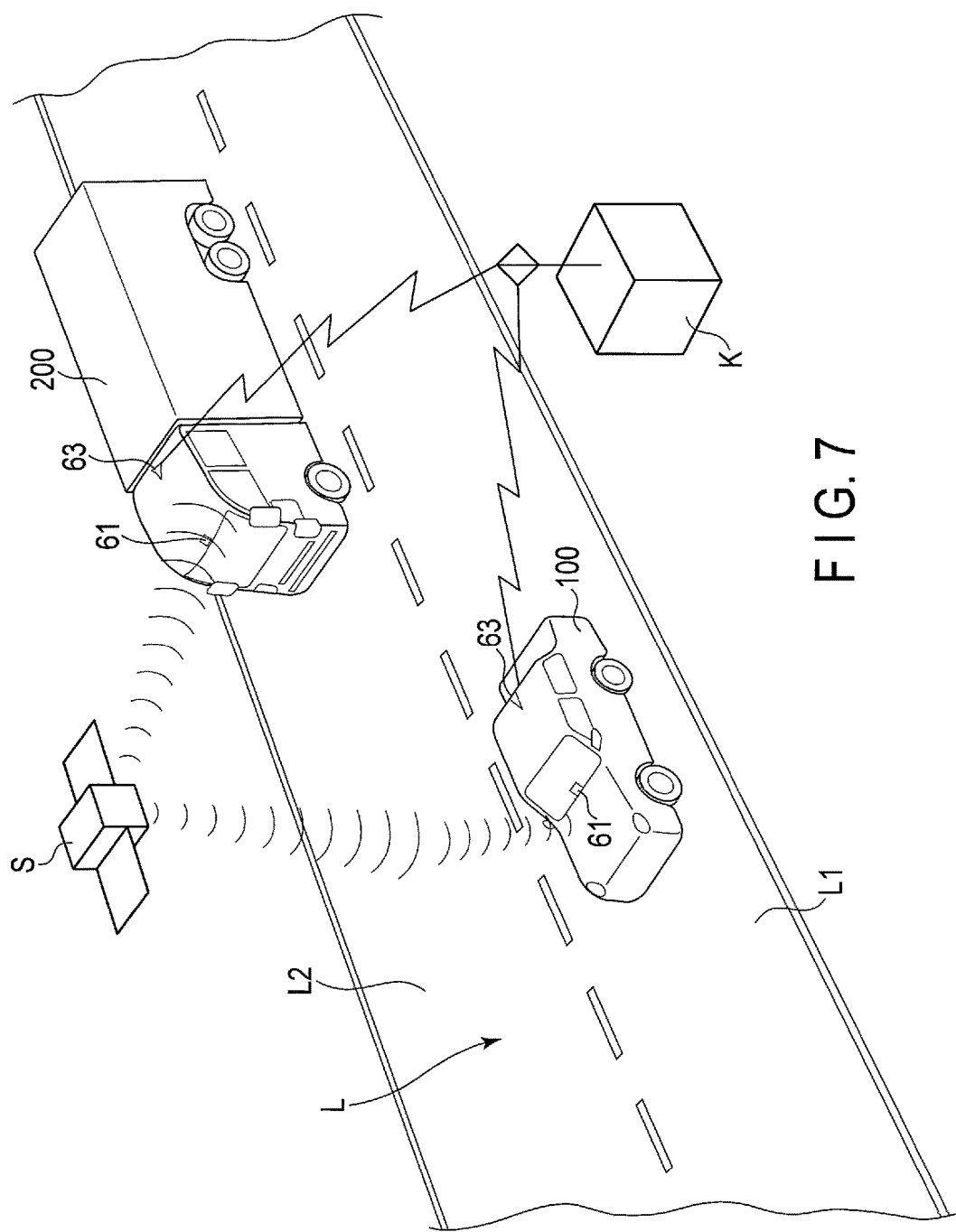
FIG. 7 is a perspective view schematically showing a state where the own vehicle and other vehicle both equipped with the driving support apparatus of FIG. 6 are travelling on vehicular lanes.

As shown in FIG. 6, the own vehicle 100 of the second embodiment comprises an antenna 61 which receives information on electric waves transmitted from a satellite S of the global positioning system (GPS), a positioning device 62 which computes the travelling position of the own vehicle 100 from the information on the electric-waves acquired from GPS and a communications device 63 which acquires the traffic information provided from the outside of the vehicle. The antenna 61 is connected to the positioning device 62, and the positioning device 62 provides the information on the travelling position of the own vehicle 100 to an other vehicle detector 12 and an other vehicle information acquisition unit 13. The communication device 63 is connected to at least the other vehicle detector 12 and the other vehicle information acquisition unit 13. The traffic information acquired by the communication device 63 includes, at least, map information of a vehicular lane L on which the own vehicle 100 is currently travelling based on the position information thereof, position information of other vehicles 200 travelling ahead and behind the own vehicle 100 and information provided from the vehicle 200, which contains at least the size of the vehicle. The information of the vehicle 200 may include, in addition to the size, the speed thereof, as in the case of the first embodiment.

The other vehicle detector 12 detects the other vehicles 200 locating on the vehicular lane L ahead of and behind the own vehicle 100 through the communication device 63 based on the travelling position of the own vehicle 100 obtained from the positioning device 62. The other vehicle information acquisition unit 13 acquires the information containing at least the sizes of the other vehicles 200 together with the travelling positions thereof through the communication device 63. It is preferably that the weights thereof should also be acquired if available in addition to the sizes. Here, the communication device 63 may communicate with a base station K which covers, in its communication range, the vehicular lane L on which the vehicle 100 is travelling, to acquire the information on the other vehicles 200, or may perform vehicle-to-vehicle direct communications with the communication devices 63 of the other vehicles 200 which have the same functions as that of the own vehicle 100 to acquire the information on the other vehicles 200.

The driving support apparatus 1 of the second embodiment uses GPS in place of the first camera 21 and the second cameras 22 and 23, and the other structures and their functions are the same as those of the driving support apparatus 1 of the first embodiment. Note that the first camera 21 and the second cameras 22 and 23 may as well be used together with GPS. Therefore, the control process for detecting the other vehicles 200 or changing the detection distance D of the detection ranges 14R and 14L of the proximity detector 14 based on the information on the other vehicles 200 is the same as that indicated by the flowchart shown in FIG. 2 of the first embodiment.

As described above, the driving support apparatus 1 of the second embodiment uses GPS and the communication device 63 to accurately acquire the position of the own vehicle 100 and those of the other vehicles 200 and obtain the information including the sizes, weights, etc. of the vehicle 100 and the other vehicles 200. Thus, a safe distance to the other vehicles 200 behind the own vehicle 100 can be secured. Moreover, the driving support apparatus 1 of this embodiment uses GPS, and therefore even if the field of view is poor in such situations including nighttime, bad weather such as fog or snow, the end of a curve or a slope, and the like, the detection of the other vehicle 200 is not substantially affected. Furthermore, when there are two or more other vehicles 200 traveling ahead and behind, even those which are hidden by the other vehicle 200 nearest to the own vehicle 100 can also be detected. Hence, a safe distance can be secured with respect to these other vehicles 200 as well.

Moreover, since the driving support apparatus 1 of the second embodiment uses GPS, it can be applied not only to the case where the other vehicles 200 travel in the same direction as that of the own vehicle 100, but also to the case where the other vehicles 200 are oncoming vehicles. In the case where the other vehicles 200 are oncoming vehicles, the other vehicle detector 12 acquires the information on the other vehicles 200 approaching from the opposite side with the communication device 63, and then based on the information, the proximity detector 14 sets the detection ranges 14R and 14L ahead of the own vehicle 100. Here, when changing the lane to the second lane L2, which is the opposite lane, to pass the other vehicle 201 traveling ahead of the own vehicle 100 as shown in FIG. 5 of the first embodiment, or to avoid an obstacle on the first lane L1, a safe distance can be secured with respect to the other vehicle 200 approaching from the front direction.

The driving support apparatus 1 of the present invention has been described by way of the first and second embodiments. These embodiments have been presented by way of example only to help the understanding of the invention when carrying it out, and are not intended to limit the scope of the inventions. Therefore, when the present invention will be performed, it is also possible to embody, even if each element is replaced with the element that has similar functions, without departing from the gist, they are also included in the present invention. Furthermore, an embodiment which is embodied mutually combining some of the component described in each embodiment or which is embodied replacing some of the component described in each embodiments may be included in the present invention.

For example, the first and second embodiments may be combined together so that the other vehicle detector 12, the other vehicle information acquisition unit 13 and the proximity detector 14 appropriately utilize the first camera 21, the second cameras 22 and 23, the radars 24 and 25 and positional information of GPS to acquire the information including the positions, sizes, etc. of the other vehicles 200.

Moreover, the driving support apparatus 1 of each of the first embodiment and second embodiment described above may be able to cope as described below, with the case where the braking distance of the own vehicle 100 is extended, such as that the visibility for the surroundings where the own vehicle 100 is traveling is low or the road conditions are bad, in other words, one of the following situations where the head lamp of the own vehicle 100 is on, the windshield wiper is being operated, and the outdoor air of the own vehicle 100 is at a predetermined temperature or lower. In such cases, it is preferable that the setting unit 16 extend the detection distance D in the rear direction by a distance predetermined for each respective case according to the size of the other vehicle 200. That is, a total distance value to extend the detection distance D, which can be obtained by adding up the distance values to be extended according to the respective conditions where the visibility is low, the road condition is bad and the like is further added to renew the detection distance D. Even in the situation where the own vehicle 100 must slow down while changing the lane to pass another vehicle, the braking distance of the other vehicle 200 can be sufficiently secured.

In the first embodiment, the vehicular lane L is described in connection with an example in which the roadway includes two-lane sections on both ways, namely, the first lane L1 on which the own vehicle 100 is traveling and the second lane L2 on which the other vehicle 200 is traveling. But, naturally, the driving support apparatus 1 is also applicable to three- or more lane sections on one side. When the own vehicle 100 is traveling on the center lane of the three sections, the central lane is referred to as the first lane L1 and the lanes on the both sides are the second lanes L2.

Moreover, in either one of the first and second embodiments, a geographical feature information acquisition unit which acquires the three-dimensional information on the vehicular lane L on which the own vehicle 100 is travelling, may be further included. In this case, based on the three-dimensional data on the vehicular lane L acquired by the geographical feature information acquisition unit and the information on the other vehicles 200 acquired by the other vehicle information acquisition unit 13, the setting unit 16 may set the detection distance D of the detection ranges 14R and 14L of the proximity detector 14. In the first embodiment, the geographical feature data acquisition unit may acquire the three-dimensional data on the vehicular lane L from the images acquired with the first camera 21 and the second cameras 22 and 23 by computing the geographical feature (for example, a slope and the radius of a curve) of the vehicular lane L. Moreover, in the first embodiment, since the own vehicle 100 comprises the antenna 61 which receives the electric-waves of information from GPS, the positioning device 62 and the communication device 63, the geographical feature information acquisition unit may acquire the three-dimensional data on the vehicular lane L by acquiring map information with the communication device 63 based on the position information on the own vehicle 100 obtained from GPS.

The setting unit 16 sets the detection distance D of the detection ranges 14R and 14L larger as the radius of a curve is smaller with reference to the case where the vehicular lane L is linear, for example, based on the three-dimensional information acquired with the geographical feature information acquisition unit. Moreover, it is also desirable to set the detection distance D of the detection ranges 14R and 14L of the proximity detector 14 according to the slope of the vehicular lane L of the three-dimensional information acquired with the geographical feature information acquisition unit. By using both of the information on the other vehicle 200 acquired by the other vehicle information acquisition unit 13 and the three-dimensional information on the vehicular lane L acquired by the geographical feature information acquisition unit, a safe distance can be secured between the own vehicle 100 and the other vehicle 200.

Each of the above-described embodiments is describe on the assumption that the device is used to comply the Road Traffic Law of Japan, which involves the left-hand traffic; however they are also applicable to the road traffic law of other countries, based on the right-hand traffic, in which case, the right and left sides are interchanged when practicing the embodiments.

What is claimed is:

1. A driving support apparatus comprising:
   a camera detecting an other vehicle travelling on a second lane adjacent to a first lane on which an own vehicle is travelling;
   a proximity controller generating a warning to a driver of the own vehicle;
   a turn signal lever that turns on an indicator to indicate intention of a driver of the own vehicle to change from the first lane to the second lane; and
   a controller and a storage storing a program that causes the controller to:
      acquire information containing at least a size of the other vehicle detected by the camera;
      compare a size of the own vehicle with that of the other vehicle and increase a distance of a detection range towards a rear side in a traveling direction of the own vehicle when the acquired size of the other vehicle is larger than a size of the own vehicle to secure an increased braking distance for the other vehicle between the own vehicle and the other vehicle when the own vehicle moves to the second lane;
      determine whether the other vehicle is located in the detection range; and
      determine whether the turn signal lever is operated in a direction in which the own vehicle is to be moved towards a same side as that where the other vehicle is detected,
   wherein the proximity controller is activated when the other vehicle is determined to be in the detection range and the turn signal lever is determined to be operated in the direction.

2. The driving support apparatus of claim 1, wherein the proximity controller includes at least one of a warning lamp to be lit at a position in sight of the driver of the own vehicle, a loudspeaker which outputs a warning sound inside the own vehicle and a vibrator which generates vibration in a steering of the own vehicle.

3. The driving support apparatus of claim 1, further comprising:
   a steering assist changing a steering angle of the steering, wherein
   the proximity controller controls the steering assist to generate a steering reaction force in a direction which inhibits the own vehicle from approaching the second lane.

4. The driving support apparatus of claim 2, further comprising:
   a steering assist changing a steering angle of the steering, wherein
   the proximity controller controls the steering assist to generate a steering reaction force in a direction which inhibits the own vehicle from approaching the second lane.

5. The driving support apparatus of claim 1, wherein the program further causes the controller to:
   increase the detection distance to a rear side by a respective distance predetermined according to the size of the other vehicle each time one of following cases is satisfied, where a head lamp of the own vehicle is lit, where a windshield wiper of the own vehicle is being operated, and outdoor air of the own vehicle is at a predetermined temperature or lower.

6. The driving support apparatus of claim 1, wherein the information of the other vehicle includes a speed of the other vehicle, and
   the program further causes the controller to:
      compare the speed of the own vehicle with that speed of the other vehicle, and decrease the detection distance in the traveling direction when the speed of the own vehicle is faster than that of the other vehicle, and increase the detection distance when the own vehicle is slower than that of the other vehicle.

7. The driving support apparatus of claim 1, wherein the camera includes a first camera which has an angle of view including the second lane ahead of the own vehicle, and a second camera which has an angle of view including the second lane of a rear-side area of the own vehicle, and
   the program further causes the controller to:
      detect the other vehicle based on images acquired by at least one of the first camera and the second camera, and
      acquire information including at least a size of the other vehicle based on images acquired by at least one of the first camera and the second camera.

8. A driving support apparatus, comprising:
   an antenna which receives electric waves emitted from a satellite of global positioning system;
   a position calculator calculating a three-dimensional position of the own vehicle from the electric wave received with the antenna; and
   a communicator acquiring information on a location near the own vehicle based on the three-dimensional position;

a proximity controller generating a warning to a driver of the own vehicle;
a turn signal lever that turns on an indicator to indicate intention of a driver of the own vehicle to change from the first lane to the second lane; and
a controller and a storage storing a program that causes the controller to:
  detect the other vehicle through the communication device based on the three-dimensional position,
  acquire information containing at least the size of the other vehicle through the communicator based on the calculated three-dimensional position,
  compare a size of the own vehicle with that of the other vehicle and increase a distance of a detection range towards a rear side in a traveling direction of the own vehicle when the acquired size of the other vehicle is larger than a size of the own vehicle to secure an increased braking distance for the other vehicle between the own vehicle and the other vehicle when the own vehicle moves to the second lane;
  determine whether the other vehicle is located in the detection range; and
  determine whether the turn signal lever is operated in a direction in which the own vehicle is to be moved towards a same side as that where the other vehicle is detected,
  wherein the proximity controller is activated when the other vehicle is determined to be in the detection range and the turn signal lever is determined to be operated in the direction.

* * * * *